: US 11,222,126 B2
(45) Date of Patent: Jan. 11, 2022

(12) United States Patent
Shelton et al.

(54) COMMUNITY GOVERNED END TO END ENCRYPTED MULTI-TENANCY SYSTEM TO PERFORM TACTICAL AND PERMANENT DATABASE AND COMMUNICATION OPERATIONS

(71) Applicant: Ardian Technologies, Boothwyn, PA (US)

(72) Inventors: Maria Shelton, Glenn Mills, PA (US); Sam Murphy, Wayne, PA (US)

(73) Assignee: Ardian Technologies, Boothwyn, PA (US)

( * ) Notice: Subject to any disclaimer, the term of this patent is extended or adjusted under 35 U.S.C. 154(b) by 299 days.

(21) Appl. No.: 16/570,875

(22) Filed: Sep. 13, 2019

(65) Prior Publication Data
US 2020/0089897 A1     Mar. 19, 2020

Related U.S. Application Data

(60) Provisional application No. 62/731,021, filed on Sep. 13, 2018.

(51) Int. Cl.
H04L 29/06       (2006.01)
G06F 21/60       (2013.01)
(Continued)

(52) U.S. Cl.
CPC ........ *G06F 21/602* (2013.01); *G06F 16/2255* (2019.01); *G06F 16/2282* (2019.01);
(Continued)

(58) Field of Classification Search
CPC .... G06F 21/602; G06F 16/27; G06F 16/2255; G06F 16/2282; G06F 21/6245;
(Continued)

(56) References Cited

U.S. PATENT DOCUMENTS 8,966,440 B2 * 2/2015 No ............................ G06F 9/44
                                                        717/113
10,025,942 B2 * 7/2018 Schaefer ................. G06F 16/21
(Continued)

*Primary Examiner* — Shin-Hon (Eric) Chen
(74) *Attorney, Agent, or Firm* — Douglas J. Ryder; Ryder, Mazzeo & Konieczny LLC

(57) ABSTRACT

A multi-tenancy system to perform tactical and permanent database and communication operations to include but not limited secure handling of personally identifiable information (PII), data management, credentialing, RFID/barcoding, social networking, biometrics, registration, secure communications, geo-location and geo-fencing, reporting, data analytics, physical security information management, mobile applications and document sharing. The system includes a security platform meeting stringent data protection mandates including a firewall with extensive security protocols, encrypting communications between various components of the system (in transit) and information within each of the components (at rest). PII information is further encrypted and is only visible with appropriate decryption key. The system utilizes a low code/no code database platform to address increasing demand for rapid, iterative and collaborative application development. The system includes a collaborative database development with a community structure approach of "who" data is needed from rather than "what" data is needed.

17 Claims, 13 Drawing Sheets

(51) Int. Cl.
*H04L 12/26* (2006.01)
*G06F 16/27* (2019.01)
*G06F 16/22* (2019.01)
*G06F 21/62* (2013.01)
*H04L 29/08* (2006.01)

(52) U.S. Cl.
CPC .......... *G06F 16/27* (2019.01); *G06F 21/6245* (2013.01); *H04L 43/08* (2013.01); *H04L 63/02* (2013.01); *H04L 63/0428* (2013.01); *H04L 67/12* (2013.01)

(58) Field of Classification Search
CPC ..... H04L 43/08; H04L 63/02; H04L 63/0428; H04L 67/12
See application file for complete search history.

(56) References Cited

U.S. PATENT DOCUMENTS

| | | | |
|---|---|---|---|
| 2018/0039501 A1* | 2/2018 | Jain | G06F 9/451 |
| 2018/0083967 A1* | 3/2018 | Subramanian | G06F 9/5072 |
| 2019/0034460 A1* | 1/2019 | Eberlein | G06F 16/285 |
| 2020/0057863 A1* | 2/2020 | Seewald | G06F 21/6218 |

* cited by examiner

COMMUNITY GOVERNED END TO END ENCRYPTED MULTI-TENANCY SYSTEM TO PERFORM TACTICAL AND PERMANENT DATABASE AND COMMUNICATION OPERATIONS

PRIORITY

This application claims the priority under 35 USC § 119 of Provisional Application 62/731,021 filed on Sep. 13, 2018, entitled "Community Governed End to End Encrypted Database" and having Maria Shelton and Sam Murphy as inventors. Application 62/731,021 is herein incorporated by reference in its entirety.

BACKGROUND

There is a convergence of various technology concepts and trends. These concepts and trends require that technology be developed and deployed with sometimes conflicting priorities. Whereas the need for advancing technologies must be provided at a faster pace, the requirement that technology must be secure and account for rising privacy concerns can slow down progress.

Legacy systems are struggling to protect their technology from increasing cybersecurity threats and also meeting stricter consumer privacy data protection laws, guidelines and considerations. As organizations look to further secure their technology and continue to deploy advancing technologies, such as Internet of Things (IoT) and the cost and effort to do so can pose a challenge both financially and operationally.

Historically to address these challenges, organizations have taken a reactive approach to combating cyber-threats and establishing effective cyber security philosophies. For advancing applications and technologies, a band aid approach for legacy systems is used to comply with challenges.

SUMMARY

A system developed from a risk management framework to comply with the latest data protection requirements. The system includes a security platform meeting stringent data protection mandates such as European Union's General Data Protection Regulation (GDPR) and the National Institute of Security Technology Cybersecurity Framework. The system utilizes a low code/no code database platform to address increasing demand for application development as traditional development approaches simply can't keep pace. Inherent value of no code/low code development enabling more rapid, iterative and collaborative development. The system includes a collaborative database development with a community structure approach of "who" data is needed from rather than "what" data is needed.

BRIEF DESCRIPTION OF FIGURES

The features and advantages of the various embodiments will become apparent from the following detailed description in which.

DETAILED DESCRIPTION

A system is provided that can rapidly be deployed to perform tactical and permanent database and communication operations to include but not limited secure handling of personally identifiable information (PII), data management, credentialing, RFID/barcoding, social networking, biometrics, registration, secure communications, geo-location and geo-fencing, reporting, data analytics, physical security information management, mobile applications and document sharing.

Figure 1:
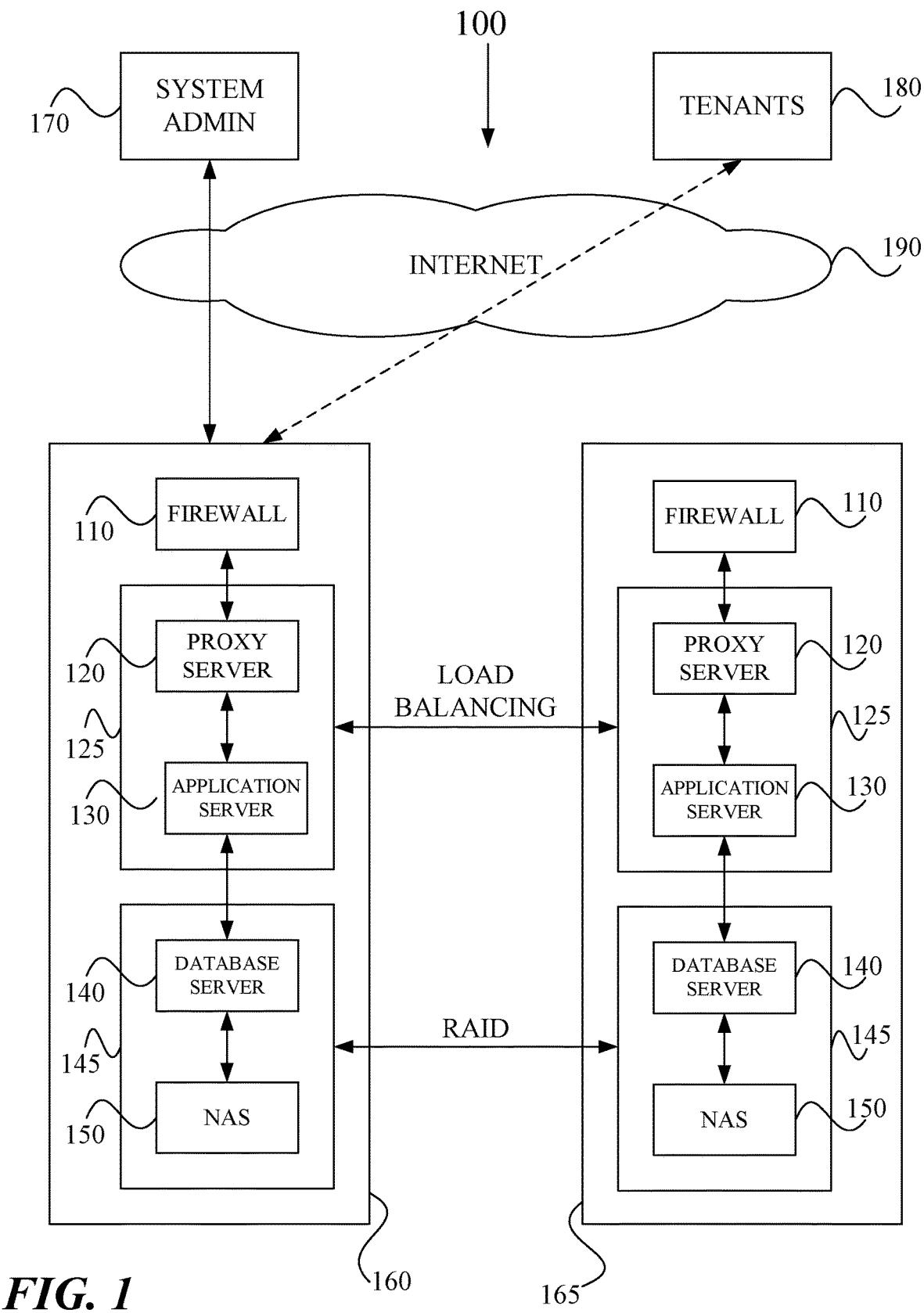
FIG. 1 illustrates an example high level system diagram, according to one embodiment.

FIG. 1 illustrates an example high level system diagram 100. The system 100 is a virtual environment that reside on servers (e.g., proxy servers, application servers, database servers) capable of cryptography (e.g., federal information processing standard (FIPS) publication 140-2 (FIPS 140-2) compliant servers). The system 100 is a distributed deployment architecture comprised of an operating system (e.g., Linux, Fedora), a web server (e.g., Apache), a user interface (e.g., CSS, JS, HTML), a web service (e.g., REST) and a language (e.g., Ruby, Angular). The system 100 includes a firewall 110, a proxy server 120, an application server 130, a database server 140 and network attached storage (NAS) 150. The proxy server 120 and the application server 130 act as a first server unit (application server unit) 125 and the database server 140 and the NAS 150 act as a second server unit (database server unit) 145.

The system 100 may be redundant and include additional components 110-150 at additional locations (e.g., primary location 160, redundant location 165). The redundant components 110-150 may act as back-up processes, be utilized for load sharing and/or for backing up data.

The system 100 is a multi-tenancy system meaning that the system may include databases for a plurality of tenants. The tenancy structure model may be a software as a service (SAAS) model, dedicated server model or shared server model. All tenants within the system 100 share the proxy server 120, the application server 130, and the database server 140, while the NAS 150 is segmented by tenant.

The system 100 may be accessed by system administrators 170 and tenants 180 remotely for programming, administration and/or use. The system 100 may be accessed via an internet service provider (ISP) dedicated fiber optic line for connecting thereto (providing an end to end secure connection) or via public internet connections. The system administrators 170 may program the system 100 as well as provide overall system administration. The system administrators 170 may connect to the system 100 via a virtual private network (VPN) over an RSA 256 encrypted connection. The system administrators 170 using the VPN are able to bypass the firewall 110 and access any server 120-140 in the system boundaries 160, 165.

The administration of the system 100 for a specific tenant and the use of the system 100 is only available to users that have been provided with an account and the appropriate permissions. Users undergo authentication by providing a username and password as well as verification through a two factor authentication (2FA) process that requires, for example, a user's mobile phone number in order to access the system 100. The users may utilize a browser on a client device (e.g., computer, tablet, phone) to log in to the system 100 via the internet 190. The system 100 utilizes hypertext transfer protocol secure (HTTPS) and transport layer security (TLS) 1.2 security protocols to transmit data between a client device and the system 100. HTTPS ensures that communications between a user's browser and the system 100 are encrypted. TLS 1.2 is the current version of cryptographic protocols that provides privacy and data integrity between the browser and the system 100.

The firewall 110 is the first component that data flows through once a user has logged into the system 100. The firewall 110 is a network security device that monitors incoming and outgoing network traffic. The firewall 110 will block unauthorized access while permitting outward communications. The firewall 110 may include intrusion detection and prevention systems (ID&PS) and internet protocol security (IPSEC) protocols. ID&PS protocols monitor the network or system for malicious activity. IPSEC has three major security protocols including authentication header protocol that provides authentication and integrity services for IP traffic, encapsulating security payload (ESP) protocol that provides protection for the entire IP packet and internet security association and key management protocol (ISAKMP) that negotiates mutually acceptable levels of authentication and encryption methods between two hosts. The system 100 allows data to be sent and received through a specific HTTPS port (e.g., port 443) and for redundancy may include another open port (e.g., port 80) that redirects all traffic to the specific port (e.g., port 443).

The proxy server (web server) 120 handles the communications (web traffic) between the client devices and the application server 130. The proxy server 120 receives data (requests) from users, examines the data, and when applicable accepts the data and forwards the data to the application server 130. Likewise, the proxy server 120 receives data (responses) from the application server 130, accepts the data and forwards the data to the appropriate client devices. Load balancing is provided between the proxy servers 120 located within the different system boundaries 160, 165. The load balancing splits traffic and distributes requests efficiently across multiple proxy servers 120 so that traffic is optimized. The proxy server 120 encrypts the data before sending the data to the client devices or the application server 130. Data encryption is compliant under FIPS 140-2.

The application server 130 houses the framework of the system application (codebase). The application server 130 may receive and process requests from the proxy server 120. The application server 130 may provide data to and receive data from the database server 140. The application server 130 may encrypt the data before sending the data to the proxy server 120 or the database server 140. Data encryption is compliant under FIPS 140-2.

The database server 140 handles storage of all data received from the application server 130. The database server 140 facilitates data and stores it on the NAS 150. The NAS 150 receives data from the database server 140 and stores the data therein. The NAS 150 is flat file storage that stores all the database files. Data in the database server 140 and the NAS 150 is encrypted and FIPS 140-2 compliant. The database server 140 and the NAS 150 are within a demilitarized zone (DMZ) which is a special network configuration that creates a sub-network firewall from the outside world.

The system 100 utilizes a redundant array of independent disks (RAID) to perform full system back-ups of the data stored in the database server unit 140, 150. RAID is a method of storing data on multiple hard disks. The levels are designated by number (e.g., RAID 0, RAID 1 or RAID 5). The system 100 utilizes RAID 10 which is a combination of level 1 (mirroring) that writes data to two or more disks at the same time and level 0 (striping) that breaks data into blocks that are written in sequence to different disks. Backup data stored in the RAID 10 is encrypted and FIPS 140-2 compliant.

The system 100 is hardened and secured in various manners. Login for all administrator and user levels requires multi-factor authentication for back-end and two-factor for front-end. Protection of data is maintained through physical and system security controls. The system may be end-to-end data encrypted at all times. All traffic through the system is recorded and monitored. All data fields containing sensitive PII is encrypted and readable only with appropriate administrator level settings with a long-digit encryption key. Protection measures are implemented against malicious file uploads with or without executable code. Countermeasures are applied for multiple external attacks including, but not limited to, denial of service (DDoS and DoS) attacks, brute force, phishing, malware, spyware, ransomware, and spoofing. All web traffic/packets use AES 256-bit, TLS 1.2, SHA-256, RSA 2048 encryption via HTTPS. Countermeasures are implemented for textile, ajax, command line, and header injections.

Figure 2:
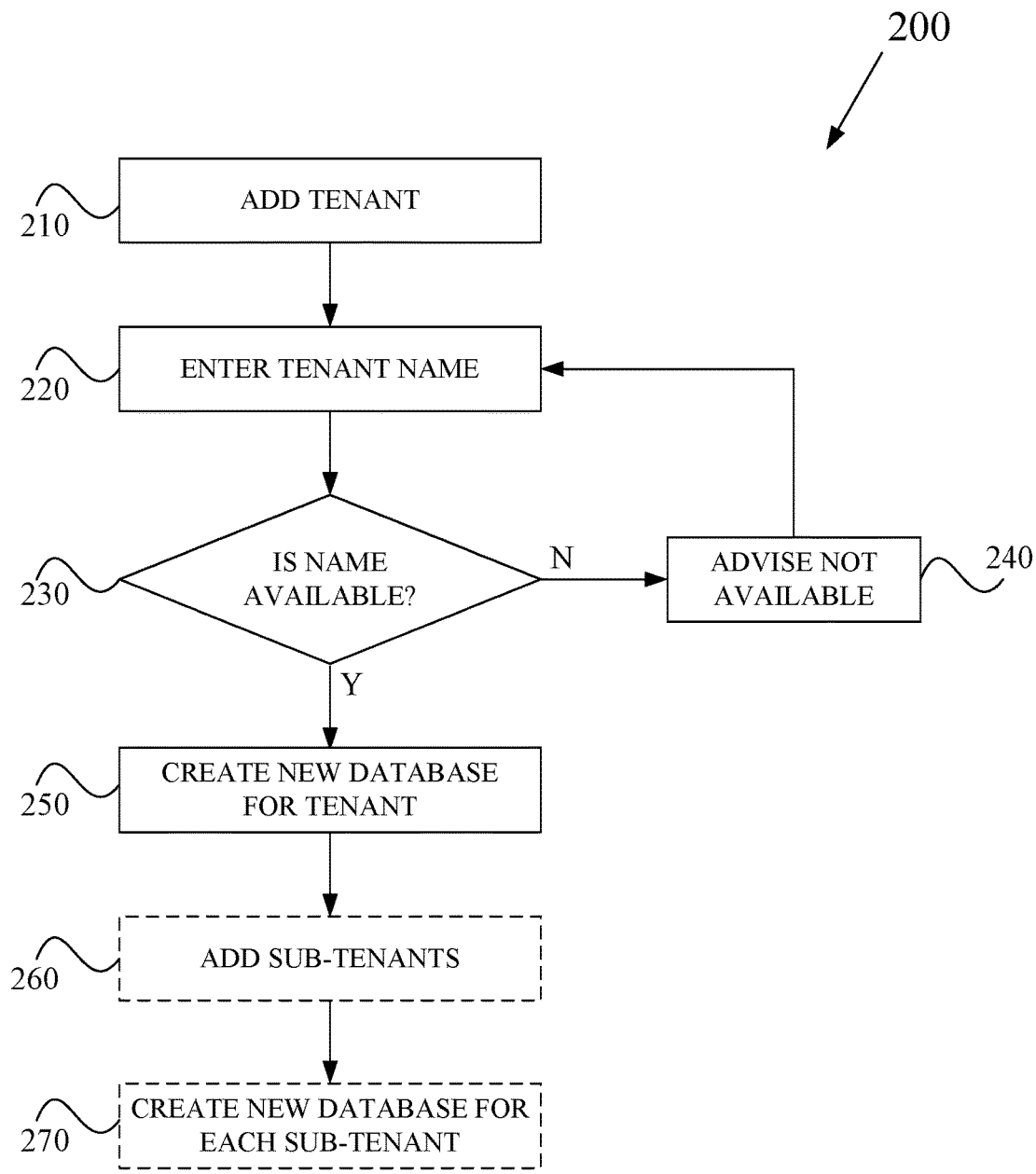
FIG. 2 illustrates an example process flow for adding new tenants to the system, according to one embodiment.

FIG. 2 illustrates an example process flow for adding new tenants to the system 200. Initially, a system administrator accesses the system via a client device (e.g., computer, tablet, phone). Once logged in, the application server unit (application server via proxy server) provides information to the client device that can be used to generate a user interface that is presented to the system administrator and the system administrator may select to an add a tenant 210. The system administrator then selects a name for the new tenant 220 and the application server determines if the name is available 230. The application server may determine if the name is available by checking the database server to determine if the database server already has that name defined and the NAS has a database established therefore. If the application server determines that the name is not available (230 No), the application server unit provides notification to the system administrator that the name is not available 240. The system administrator may then select a new name 220.

If the application server determines the name is available (230 Yes), the application server defines the new tenant in the database server and creates a new database for the tenant in the NAS 250. If the tenant desires to have sub-tenants, the system administrator may select to add sub-tenants 260. The application server defines the new sub-tenant in the database server and creates a new database for the sub-tenant in the NAS 270.

It should be noted that steps 260-270 are illustrated with dotted lines to indicate this is an optional step, as not all tenants will define sub-tenants. The process flow 200 is in no way intended to be limited to the illustrated steps. Rather, additional steps can be added, steps can be combined, steps can be deleted, steps can be modified and/or the order of the steps can be modified without departing from the current scope. The process flow 200, or portions thereof, may be performed by a processor executing instructions stored on a computer readable storage medium. The various steps may be performed by different components of the system. For example, some steps may be performed by the proxy server 120, the application server 130 or the database server 140, and some steps may be performed by a combination of components (e.g., the application server 130 and the proxy server 120, the application server and the database server 140). Some steps may require the use of devices outside of the system, such as a client device (e.g., computer, tablet, phone) to display an applicable user interface. The user interfaces described in process 200 are not limited to any specific embodiment. Rather, any user interface (or combination of user interfaces) that enable the functions to be performed is considered within the scope of the current invention.

Figure 3:
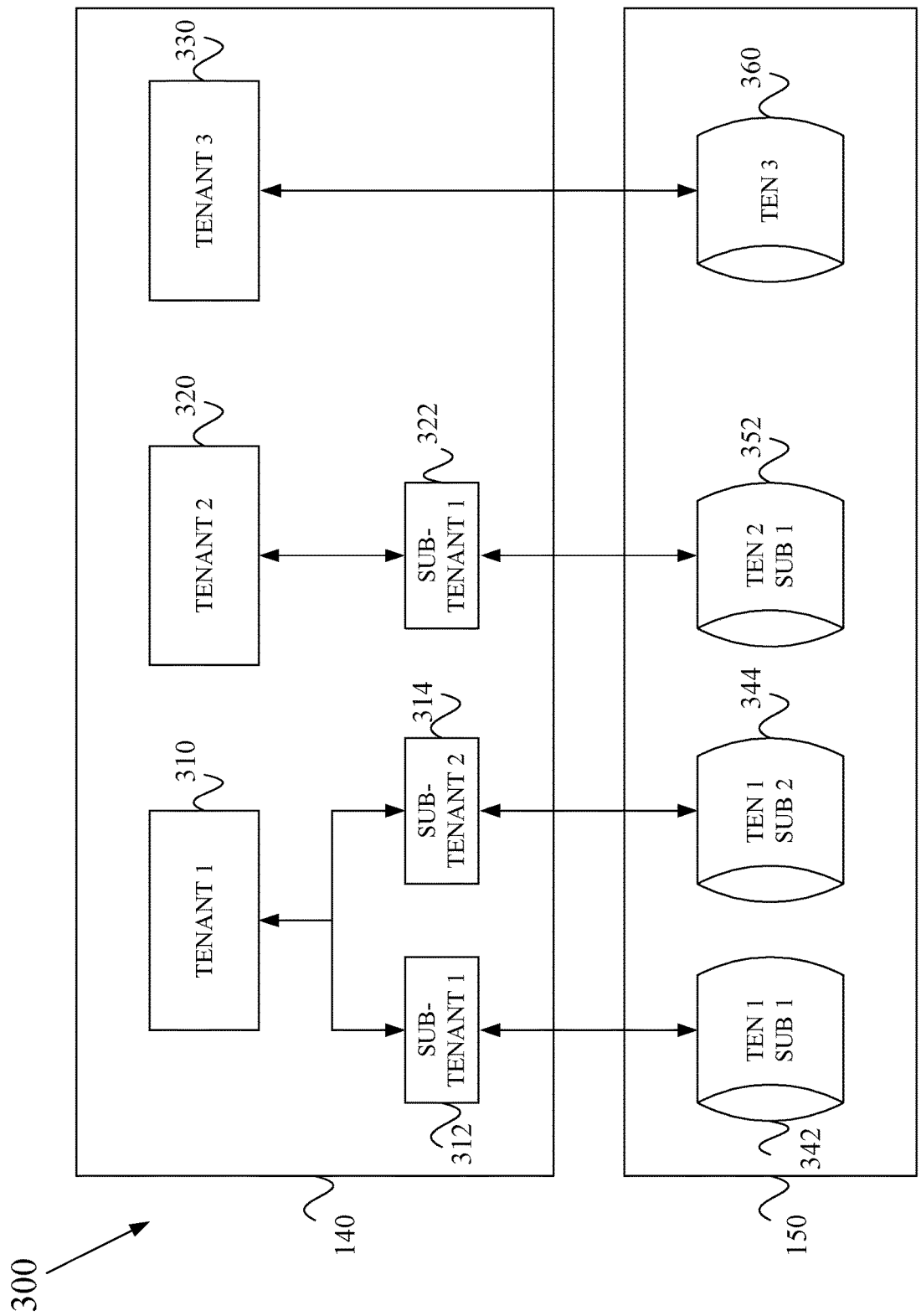
FIG. 3 illustrates an example of a multi-tenancy system, according to one embodiment.

FIG. 3 illustrates an example of a multi-tenancy system 300. The database server 140 has the tenants and the tenancy hierarchy defined and the NAS 150 includes a database for each tenant and/or sub-tenant. As illustrated, the database server 140 has three tenants 310, 320, 330 defined. The first tenant 310 includes two sub-tenants 312, 314, the second tenant includes one sub-tenant 322 and the third tenant 330 does not include any sub-tenants. The NAS 150 has databases for the first sub-tenant of the first tenant 342, the second sub-tenant of the first tenant 344, the first sub-tenant of the second tenant 352 and the third tenant 352.

As described above, the system administrator 170 may login to the system and utilize a user interface to manage the tenants defined therein. The application server unit 125 (the proxy server based on instructions from the application server) may provide the commands so that an appropriate user interface may be presented to the system administrator 170 and process the commands/input provided by the system administrator 170 to create the appropriate tenant structure and create the tenant and/or sub-tenant database. Once a tenant/sub-tenant is added (a database is created therefore), data may be added to the appropriate database and be accessed therefrom. The data may be written to the database and accessed from the database by the tenants 180. For example, users associated with the tenant 180 may log into the system and utilize a user interface to write data to and/or read data from the appropriate database. The users of the tenant may be various different user types that will be described in more detail later. The various different user types may be able to perform different tasks. The application server unit 125 may provide the appropriate user interface to the user associated with the tenant 180 and process the commands/input provided thereby to perform the appropriate actions (e.g., read/write data).

Each tenant/sub-tenant with the system 100 utilizes communities as a governing body structure for operation thereof. Communities are a user hierarchy that replicates an organizational structure. The community structure may be simple or complex. Communities are a way to configure a database structure for managing people as a nested or linear grouping. The community structure, whether simple or complex, may automatically compartmentalize people (records) in groups. The communities may manage data and allow users to interact and communicate. The use of functional features in the system is based on permission by user type by community. The communities structure establishes default collaborative user interactions (parameters).

The system is designed so that any community that contains data may not have other communities nested under it while any community that does not contain data may have other communities nested under it. A top-level community may be a highest placement in any community structure. A top-level community that has data is a standalone community. A multi-level community includes subcommunities nested under a parent community where the parent community does not contain data and may be a top-level community or a sub-level community. Any community defined to contain data such as a standalone community or a sub-community may be edited to be a parent community as long as there is no data (records) currently contained in the community. Likewise, any community defined to not contain data such as a top-level community or parent community may be edited to contain data as long as there are currently no subcommunities nested thereunder.

The use of communities enables the database to be built by first considering who needs to complete, manage and utilize information and organizing these entities into predetermined groupings. The database may be configured after the pre-determined groupings have been formed. This allows for all fields in the database, and features and micro-services that may be offered by the system, to be built from a user-centric point of view. This is different than the standard database configuration that normally starts with what the table structure and field requirements are.

Figure 4:
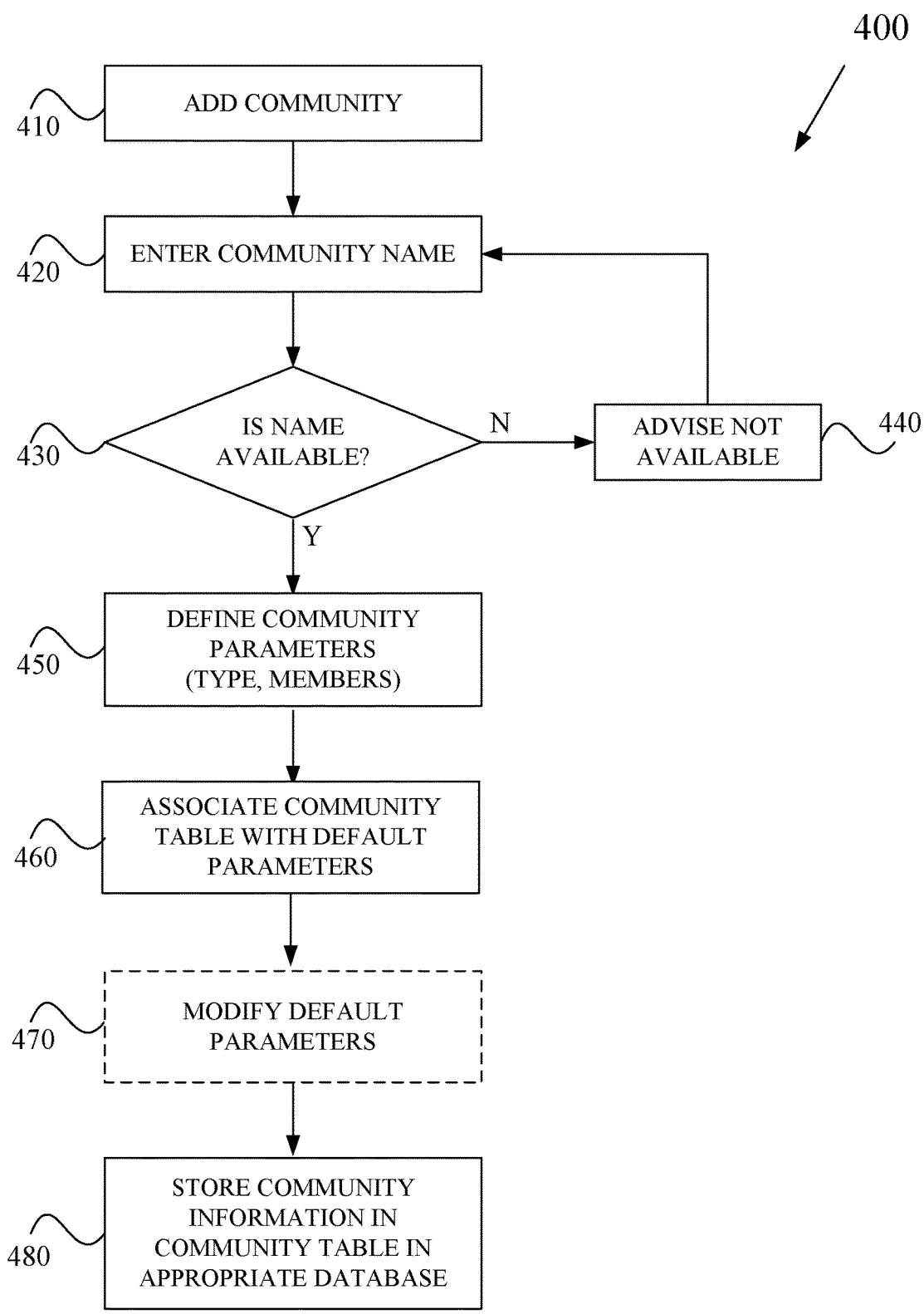
FIG. 4 illustrates an example process flow for adding communities for the tenant/sub-tenant, according to one embodiment.

FIG. 4 illustrates an example process flow for adding communities for the tenant/sub-tenant 400. Initially, a tenant administrator accesses the system via a client device (e.g., computer, tablet, phone). Once logged in, the application server unit provides instructions utilized to generate a user interface for the tenant administrator and the tenant administrator selects to an add a community 410 and then selects a name for the new community 420. The application server unit processes the selection and input provided by the tenant administrator on the user interface and determines if the name is available 430. The application server may determine if the name is available by checking the database server unit to determine if the community name has already been utilized and there is a community table with that name within the tenant database in the NAS. If the application server determines that the name is not available (430 No), the application server unit provides notification to the tenant administrator via the user interface that the name is not available 440 so that the system administrator may select a new name 420.

If the application server determines the name is available (430 Yes), the application server unit provides instructions to generate a user interface to gather additional information about the community. The tenant administrator may utilize the user interface to define parameters for the community including for example the type of community it is, individuals that are part of the community, and appointment of a community administrator 450. The community type may be a stand-alone community or a multi-level community. If the community is defined as a multi-level community then the tenant administrator defines the community as a parent community or a sub-level community. If the community is defined as a parent community the tenant administrator may be prompted to add sub-communities thereunder. If the community is defined as a sub-level community the user interface may prompt the tenant administrator to define the parent community that the sub-community is a part of.

The application server unit may associate default collaborative user interactions (parameters) with the communities 460. The default parameters may define, for example, what is required to add different type of users to the community and what is required to enable communications between users within the community or between communities. The default parameters may be stored in a default parameters table in the NAS. The application server unit may provide a user interface that provides the tenant administrator the ability to change the default parameters 470. The application server unit may then store the community information in a community table in the database for the tenant/sub-tenant in the NAS 480. The community table structure is a B-tree database structure that is traversed allowing for placement/grouping of information based on community membership. When the application server is processing information for a particular community it may retrieve the community table and the default parameters table in order to create a community object that is used to guide the operation thereof.

It should be noted that step 470 is illustrated with a dotted line to indicate this is an optional step as not all communities will modify the default parameters. The process flow 400 is in no way intended to be limited to the illustrated steps. Rather, additional steps can be added, steps can be combined, steps can be deleted, steps can be modified and/or the order of the steps can be modified without departing from the current scope. The process flow 400, or portions thereof, may be performed by a processor executing instructions stored on a computer readable storage medium. The various steps may be performed by different components of the system (e.g., the application server 130, the proxy server 120 and/or the database server 140). Some steps may require the use of devices outside of the system, such as a client device to display an applicable user interface. The user interfaces described in process 400 are not limited to any specific embodiment. Rather, any user interface (or combination of user interfaces) that enable the functions to be performed is considered within the scope of the current invention.

Figure 5:
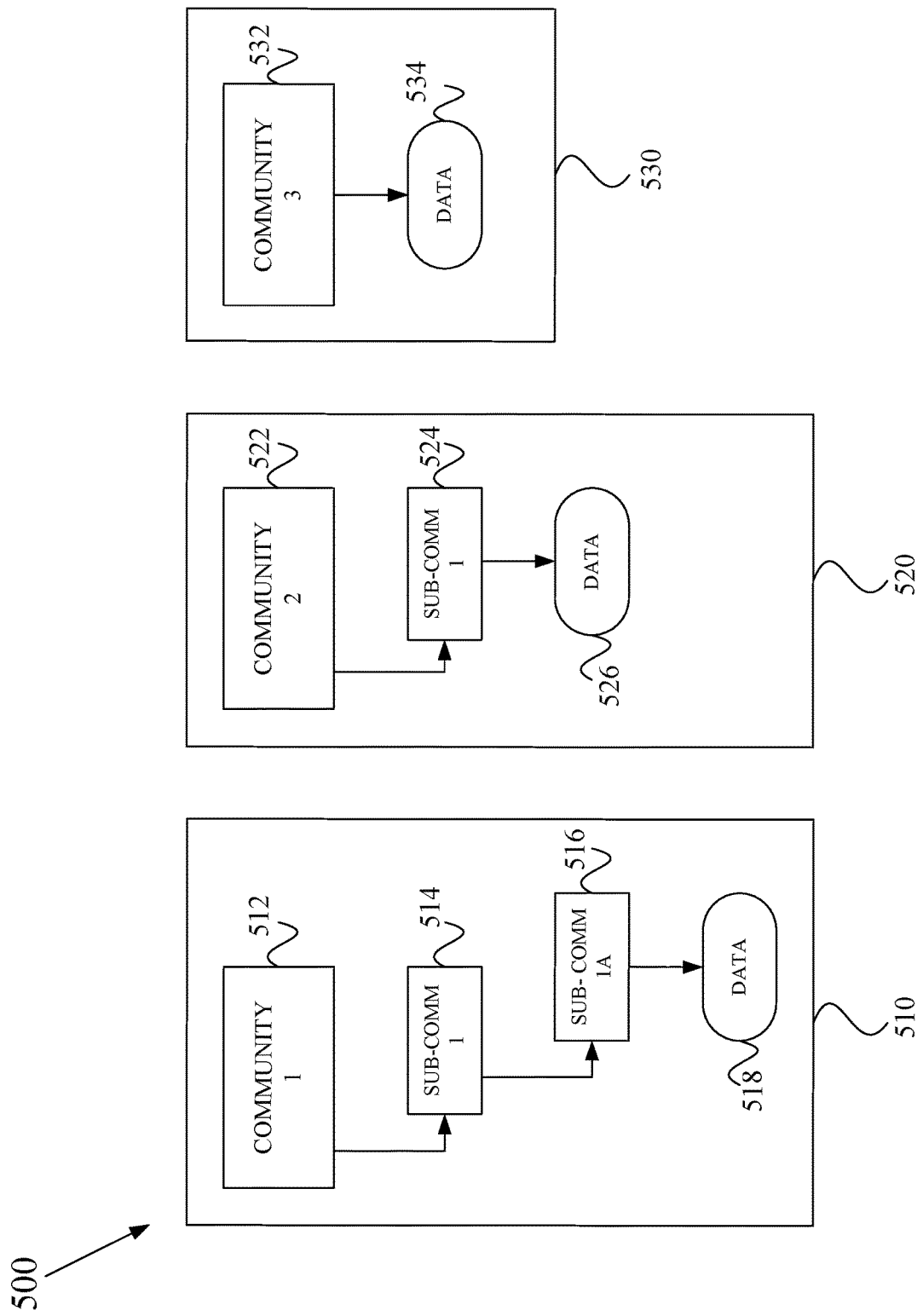
FIG. 5 illustrates an example community structure for a tenant (or sub-tenant), according to one embodiment.

FIG. 5 illustrates an example community structure for a tenant (or sub-tenant) 500. The community tables stored in the tenant database within the NAS define the community structures. As illustrated, the tenant includes three community structures 510, 520, 530 (the NAS has three community tables). The first community structure 510 is a multi-level community structure having a top level community 512, a sub-community 514 and a sub-sub-community 516. The top level community 512 is a parent community (a placement header) having sub-communities defined thereunder (only one shown for ease of illustration) and therefore not capable of containing data. The sub-community 514 is also a parent community having sub-communities defined thereunder (only one shown for ease of illustration) and therefore not capable of containing data. The sub-sub-community 516 does not have any communities defined thereunder so it may contain data 518.

The second community structure 520 is a multi-level community structure having a top level community 522 and a sub-community 524. The top level community 522 is a parent community (a placement header) having sub-communities defined thereunder (only one shown for ease of illustration) and therefore not capable of containing data. The sub-community 524 does not have any communities defined thereunder so it may contain data 526. The third community structure 530 is stand-alone community structure having only a top-level community 532. As the top-level community 532 does not have any communities defined thereunder it may contain data 534.

It should be noted that for ease of illustration the multi-level community structures only include a single sub-community under each parent community and only a single community containing data but are in no way intended to be limited thereby. Rather, the multi-level community structures may include multiple nested communities without departing from the current scope. For example, the multi-level community structure 520 could include a plurality of sub-communities containing data under the top-level community 522. The multi-level community structure 510 could include a plurality of sub-communities under the top-level community 512 and one of more of the sub-communities could include one or more sub-sub-communities thereunder while one or more other sub-communities could contain data.

As described above, a tenant administrator 180 may login to the system and utilize a user interface to create the communities. The application server unit 125 may provide the appropriate user interface to the tenant administrator 180 and process the commands/input provided by the tenant administrator 180 to manage (create, edit) the appropriate community structure. Once the community structure is created (the community table is created in the tenant database), data may be added to the database and be accessed therefrom. For example, a community administrator may be able to amend the community structure or the parameters associated therewith. Furthermore, data may be written to appropriate tables in the tenant database and accessed from the database for an appropriate community level (e.g., sub-sub-community 516, sub-community 524, community 532). The data may be written and/or read in different manners that will be discussed in more detail below.

The system 100 may allow for an infinite number of communities to be defined. However, the number of communities that may be defined for each tenant may be restricted based on available disk space for the tenant. Various user types may be defined in the system. Users may be administrators (e.g., tenant administrator, community administrator), individuals with login access to the system (e.g., individual users), or individuals registered to enter data into the system but that cannot otherwise access the system (e.g., registrants). Administrators and individual users have login privileges to the system.

One or more users may be designated as a community administrator for a specific community. One or more users may be designated as tenant administrators for an entire database for the tenant (or sub-tenant) including all communities defined therefore. A community administrator may control access to the community (determine who the members are) and may manage all users and registrants who are members of their community. A community administrator may control the features of the system that are enabled for individual users within the community. For example, an administrator may provide a registrant with login permissions (make them an individual user) and provide them access to just their data. Other individual users may have access to different amounts of data and different features of the system.

Registrants must be approved first to become a member of a community by a community administrator. Registrants may request to become members of a community via a public form. Registrants can be members of multiple communities. Individual users must be approved by, and provided login privileges by, the community administer. Individual users can be members of one or multiple communities. Individual users may have different privileges for different communities.

As previously noted, a community may be associated with default parameters 460. However, the default parameters may be changed by an administrator (e.g., tenant administrator, community administrator) 470. The change to the default parameter may be defined, for example, in a field in the community table.

A community may define requirements for administrative approval of registrants to be a member of the community. According to one embodiment, the default parameters for registrant approval may be the most restrictive (e.g., tenant administrator). The administer may determine that the default parameters are too restrictive and may lessen the approval level. If the registrant approval level is set to tenant administrator approval, the tenant administrator may be the only one that can approve registrants to be a member of the community. If set to community administrator or above approval, the community administrator or tenant administrator may be the only ones to approve registrants to be a member of the community. If set to administrative approval not required, then neither the community administrator nor the tenant administrator need to approve registrants to be a member of the community (registrants may add themselves to the community).

The communities may require registrants wishing to join the community to have completed a certain process (e.g., pass a background check) before they can join. According to one embodiment, the default parameters may define that the certain process is not required. The administrator may determine that the certain process should be performed and may accordingly change the default parameter to require the process. According to one embodiment, the certain process (e.g., namecheck) may require all members of a specific community have to go through a background check process. All pertinent information of proposed members for the community will be available to designated agencies to perform the background check. The proposed members will only become members if they pass the background check.

The system 100 provides the ability for users to communicate (connect) with other users or communities to communicate with other communities for a specific tenant. A default communications level may be associated with a community but the administrator may change the default communication level. If the communications level for the community is defined as private, communications with users that are not part of the community would be prohibited. If the community is not marked private, then requests from connections may be considered. The requests may be considered by a tenant administrator, a community administrator and/or a user. In some cases, an administrator may need to approve a request before a user even sees the request (e.g., for VIP users). If a user is in multiple communities, the connections to the user may be based on most restrictive community.

If a user is denied a connection to another user or a community, they may not be able to connect thereto. However, if a connection was established (accepted) and then it is removed by a user or community for some reason it may be added back at a later time without the acceptance process occurring again. The communities and/or the other users within the system that a user establishes a connection with may be defined as the users network. These communities and/or other users may be captured in a network table in the tenant database within the NAS 150.

The system 100 allows users to create community focused/committee structured user engagements, build secure databases and custom web data collection forms, share documents and files, create event invitations, schedule, and track event responses and attendance, run robust reports for analysis, communicate through team messaging, peer to peer, texts, and email, and build mobile apps and/or integrate hardware and software through API. The system 100 promotes greater data visibility and analysis with real-time information sharing from multiple sources within the same platform. The systems community-centric tools allow tenants to build their own secure collaborative information exchange network.

In using the data organized and collected through the system 100, tenants 180 can then compile that data to be used to perform necessary name checks, print credentials, implement access control solutions, manage reports, communication, and collaborate with users in the system to manage business/mission critical functions.

Figure 6:
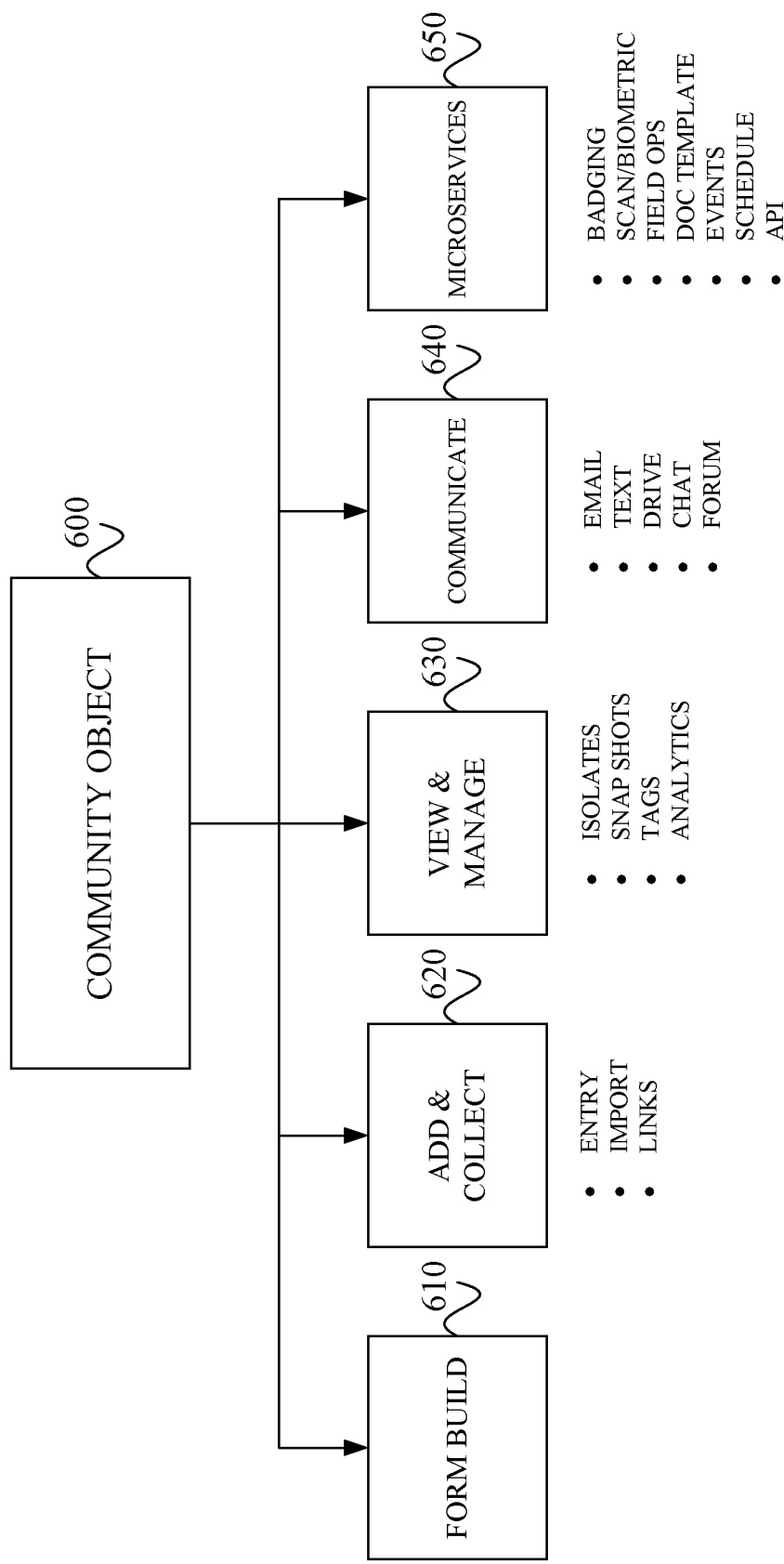
FIG. 6 illustrates an example structure showing communities being the governing body for overall system operation, according to one embodiment.

FIG. 6 illustrates an example structure showing communities being the governing body for overall system operation. The communities table (with changes to default parameters) and the default parameters table stored in the NAS are processed by the application server to generate a community object 600. During operation of the system, the application server 130 may utilize the community object 600 to permit and guide the use of various features offered by the system. The permitted uses of the system maintain the intended workflow of the community structure. As illustrated, the various features offered by the system include form building 610, adding and collecting data 620, viewing and managing data 630, communicating 640 and microservices using the data 650.

The form builder 610 segments field requirements by community. One form may be utilized for multiple communities. Same fields can be used for multiple communities whether on same or different forms. Different fields may be used for each community. The adding and collecting of data 620 may include manually entering the data into a form, importing data from an external source, or providing a link to capture the data from a form. The view and managing of data 630 enables searches to be performed and reports to be generated based on data associated with one or more communities. The types of reports that mat be generated include isolates, snap-shots, tags and analytics. The communications 640 enables users to communicate with other users belonging to same community (or communities) or users from other communities based on permissions (added to personal network). The types of communications include email, text, drive, chat and forum. The microservices 650 may include badging, scanning and biometrics, field operations, document templating, events, scheduling, f and integrating with application program interfaces (API). Each of these features will be discussed in more detail in the below figures.

Figure 7:
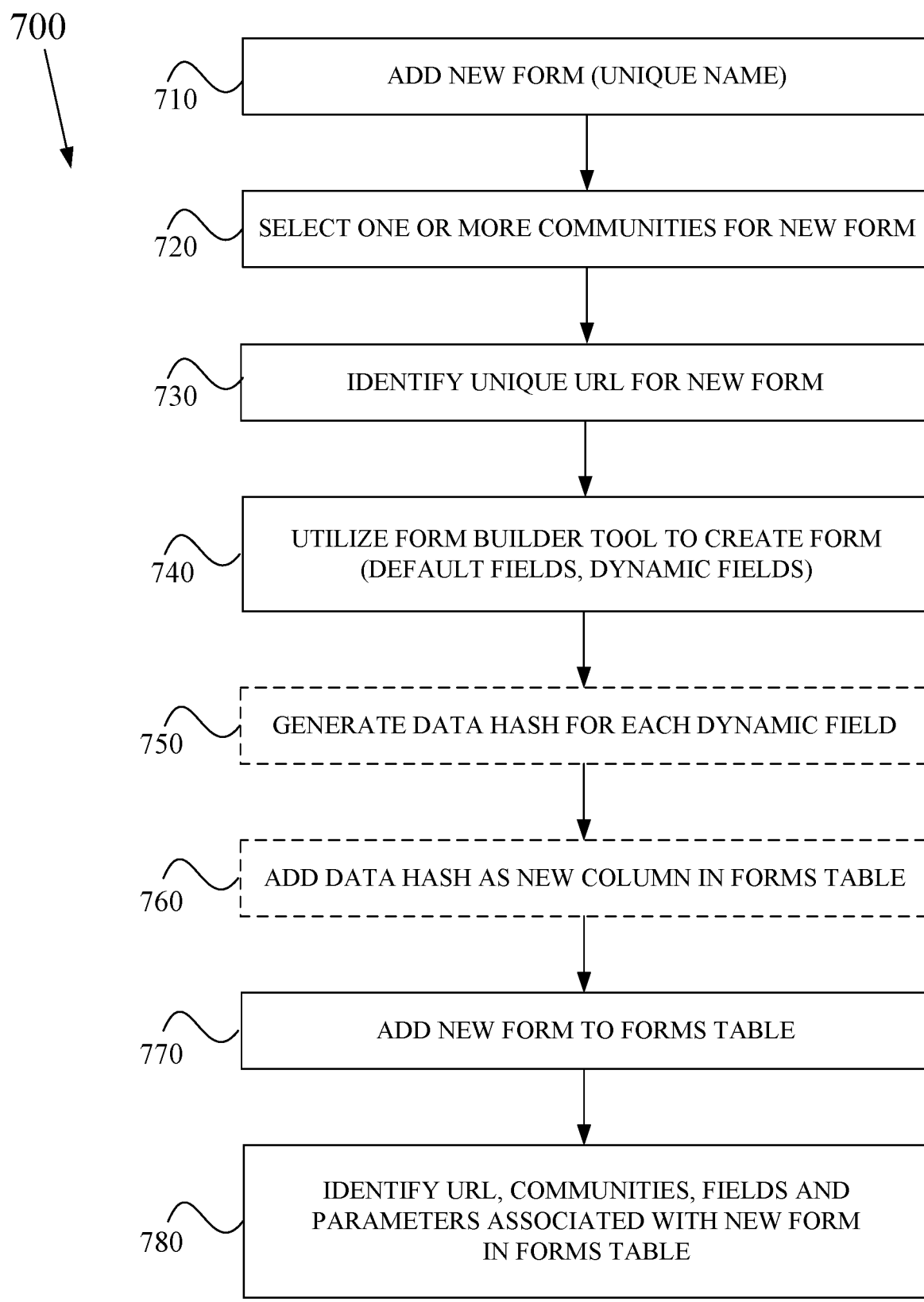
FIG. 7 illustrates an example process flow for creating forms utilized to capture data for the system, according to one embodiment.

FIG. 7 illustrates an example process flow for creating forms utilized to capture data for the system 700. Initially, a tenant administrator or community administrator (or authorized user) accesses the system via a client device. Once logged in, the application server unit provides instructions for providing a user interface to the administrator and the administrator selects to add a form 710. The administrator may provide a name for the form and the system (e.g., application server) may determine if the name is available. The administrator identifies one or more communities that are associated with the form (that may use the form or that the form may collect data for) 720. The administrator identifies an internet address (URL) for the form 730. The internet address may be where an electronic version of the form is located when it is generated. The internet address may be utilized to provide external access to the form via a client device over a secure Internet connection.

The administrator may utilize a form builder tool to create the form to capture desired data 740. The form builder tool may include one or more features including, but not limited to, drag and drop field creation, design placement, view/edit permissions by field, multiple section or page options, turn on/off features, late submission setting, communities segregation setting and encryption of field settings. The form created may include standard or default fields (e.g., fields that are already included as columns in a forms table) that are available for selection. Certain default fields, such as those that contain PII, may be encrypted fields. Some default fields may have a default encryption setting but enable the administrator creating the form to change the setting (e.g., turn off encryption, add encryption). The form created may also include dynamic or custom fields that were not available for selection (e.g., are not included as columns in a forms table). The dynamic fields may also define encryption settings.

The application server creates a data hash for the dynamic fields 750. The application server directs the database server to add the data hash for the dynamic field as a column in the forms table in the NAS 760. The use of the data hash allows the field to be added as a column without a restart of the system being required. The application server directs the database server to add the form to the forms table 770 and then to identify the URL for the form, the communities associated with the form, the various fields (default and dynamic) included in the form and the parameters associated with the fields and parameters associated with the layout of the form in the forms table 780.

It should be noted that steps 750, 760 are illustrated with dotted lines to indicate these are optional steps as not all forms will include dynamic fields. The process flow 700 is in no way intended to be limited to the illustrated steps. Rather, additional steps can be added, steps can be combined, steps can be deleted, steps can be modified and/or the order of the steps can be modified without departing from the current scope. The process flow 700, or portions thereof, may be performed by a processor executing instructions stored on a computer readable storage medium. The various steps may be performed by individual components (e.g., the application server 130, the proxy server 120, the database server 140) or combinations of components of the system. Some steps may require the use of devices outside of the system, such as a client device to display an applicable user interface. The user interfaces described in process 700 are not limited to any specific embodiment. Rather, any user interface (or combination of user interfaces) that enable the functions to be performed is considered within the scope of the current invention.

Figure 8A:
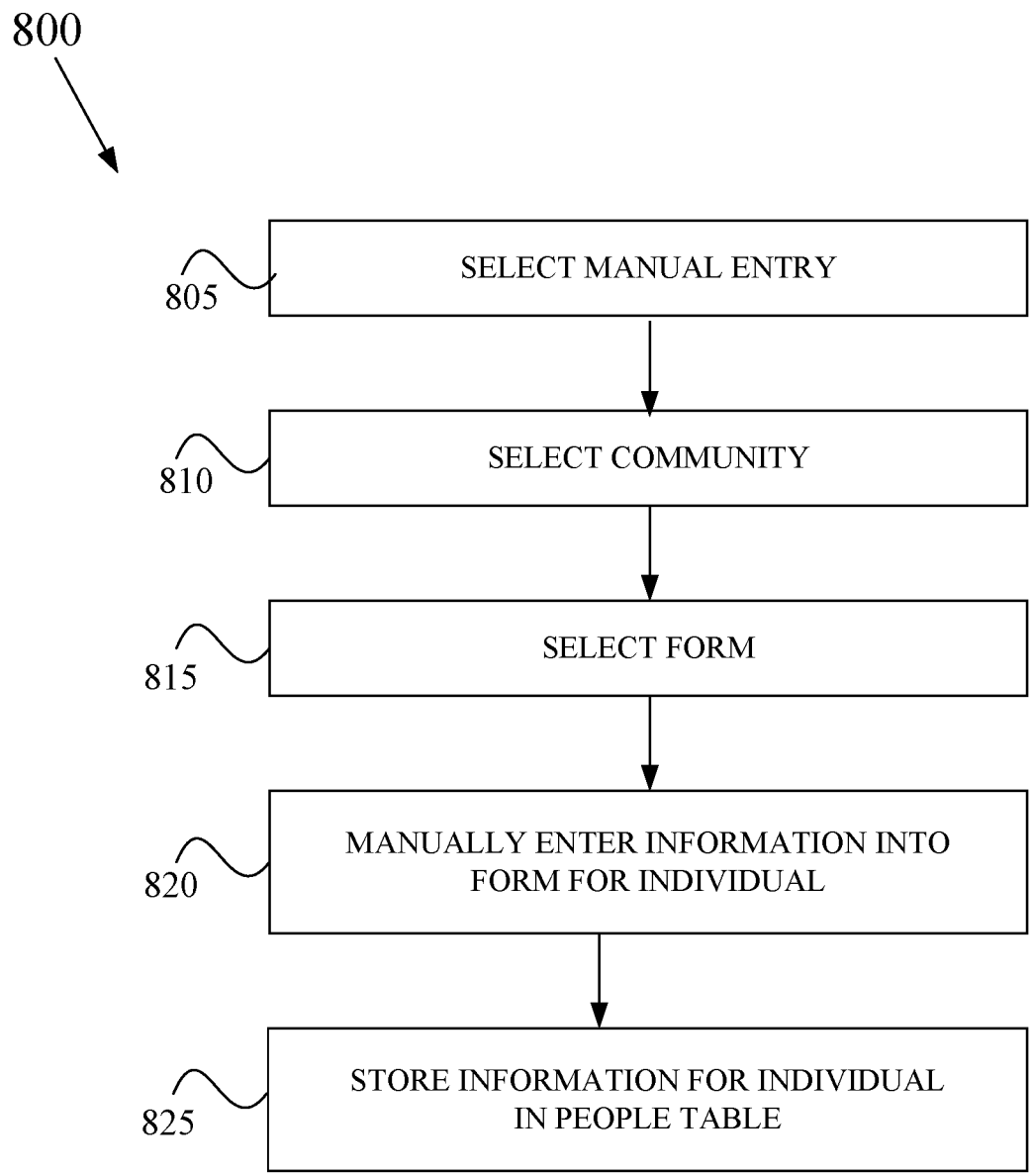
FIGS. 8A-C illustrate several example process flows for collecting data, according to various embodiments.
Figure 8B:
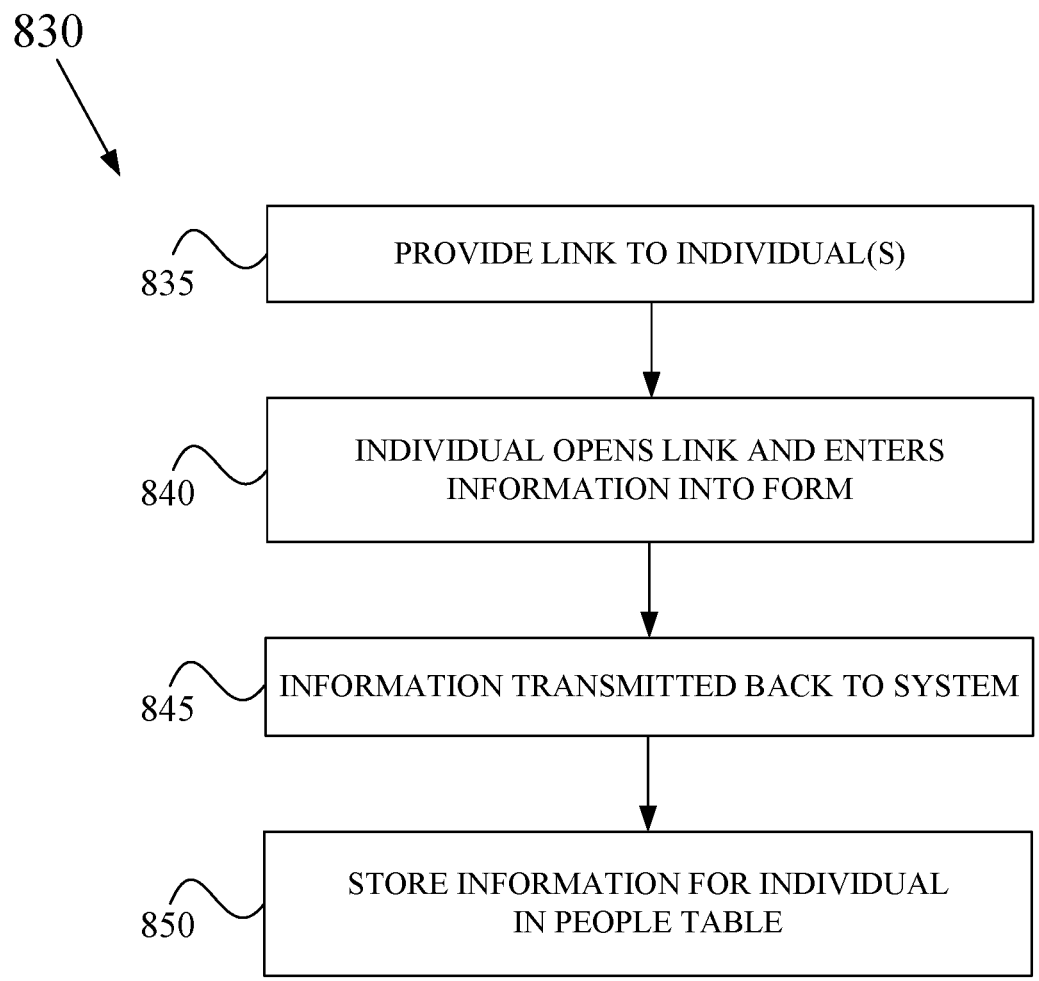
Figure 8C:
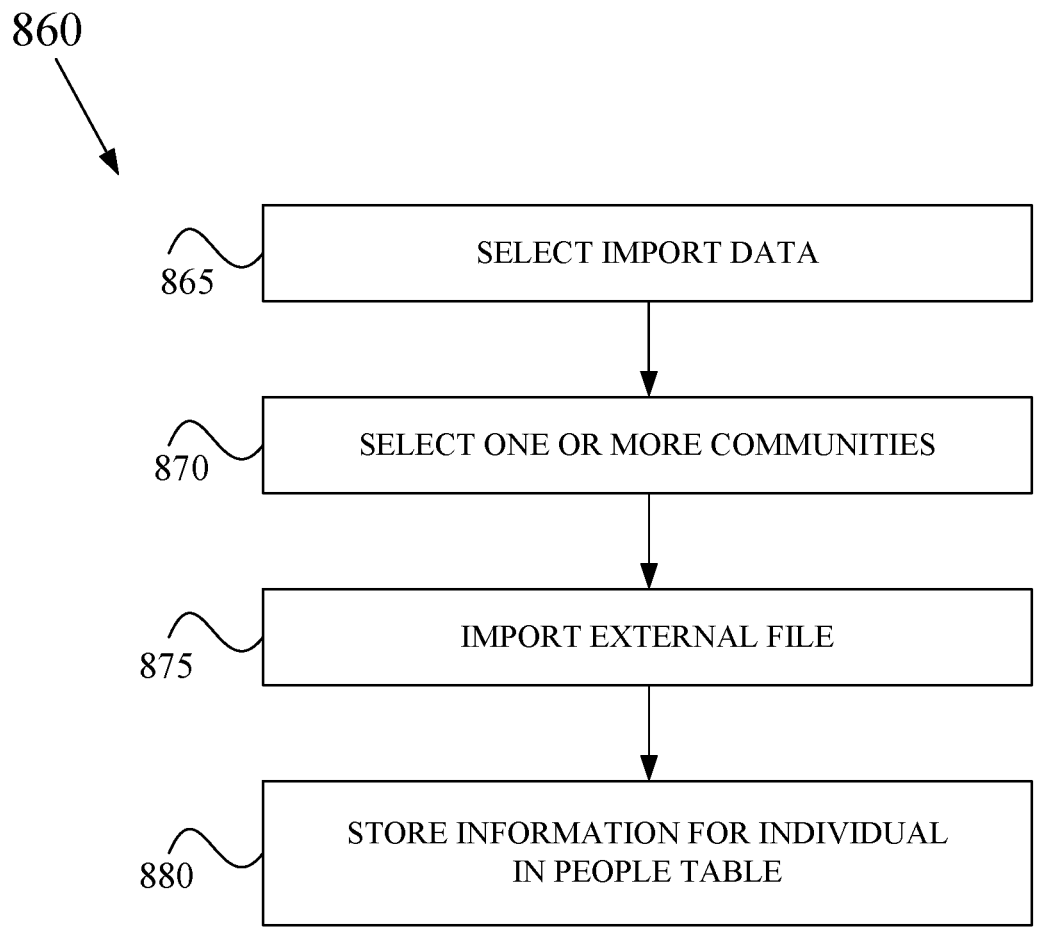

FIGS. 8A-C illustrate several example process flows for collecting data. FIG. 8A illustrates an example process for manually entering information 800. An administrator (or authorized user) selects manual entry on the user interface 805 and then selects the community that they want to enter information for 810. The administrator selects a valid form for the community 815 and then manually enters data into the form for an individual 820. The information that is being entered may have been provided to the administrator for entry through various means including verbally or in writing. After the information is entered and the form is submitted, the information is stored for the individual in appropriate columns of a people table in the appropriate (tenant/sub-tenant) database 825.

FIG. 8B illustrates an example process for enabling individuals to directly enter their information into the form 830. An individual is provided with a link for the specific form that their information is requested for 835. The link is associated with one or more communities and the specific form. The link may be provided electronically to the individual via, for example, email or text. The individual can click on the link on a client device and be taken to the internet address where the form is located. Alternatively, the internet address may be provided to the individual, for example, verbally or in writing and the individual may enter the internet address on their client device in order to be taken to the form. The application server unit may generate the form and present it at the defined internet address based on the information stored in the form table for the specific form. The internet address provides a secure connection between the client device and the system. The individual may enter the information into the electronic form that is presented on the client device 840. Once the individual is done entering the information they may submit the form which will result in the information being transmitted to the system via the secure link 845. The information received by the system via the secure link is stored for the individual in appropriate columns of the people table in the appropriate database 850.

FIG. 8C illustrates an example process for importing information 860. An administrator (or authorized user) selects import data on the user interface 865 and then selects one or more communities that the information is associated with 870. The administrator then imports an external file 875. The imported file may be any comma-separated value (CSV) file format. The information contained in the imported file may be extracted from the file and stored in appropriate columns in the people table 880. If the imported file has no unique identification for the individual that the information is associated with already in the people table, a new record for the individual may be added to the people table. If the imported file includes a unique identification for the individual (e.g., email address, phone number) that is already in the people table, but the unique identification is not system generated (e.g., badge identification), the information may be utilized to either update the existing record for the individual or to add a new record therefore. The user interface may prompt the administrator to identify whether to create a new record or update the exiting one for the individual. If the imported file includes a unique database ID (badge identification) for the individual, the information may be used to update the current record for the individual.

The process flows 800, 830, 860 are in no way intended to be limited to the illustrated steps. Rather, additional steps can be added, steps can be combined, steps can be deleted, steps can be modified and/or the order of the steps can be modified without departing from the current scope. The process flows 800, 830, 860, or portions thereof, may be performed by a processor executing instructions stored on a computer readable storage medium. The various steps may be performed by individual components (e.g., the application server 130, the proxy server 120, the database server 140) or combinations of components of the system. Some steps may require the use of devices outside of the system, such as a client device to display an applicable user interface.

The user interfaces described in process flows 800, 830, 860 are not limited to any specific embodiment. Rather, any user interface (or combination of user interfaces) that enable the functions to be performed is considered within the scope of the current invention. The application server 130 may provide the information needed to generate the appropriate user interfaces and the information provided within the user interfaces may be based on information stored in various tables in the database on the NAS 150 for the particular tenant and selections made on the user interfaces. For example, the communities available may be based on information previously stored in the community table and forms available may be based on the community selected and information previously stored in the forms table. The database server 140 may write the information to the appropriate tables in the database within the NAS 150.

Figure 9:
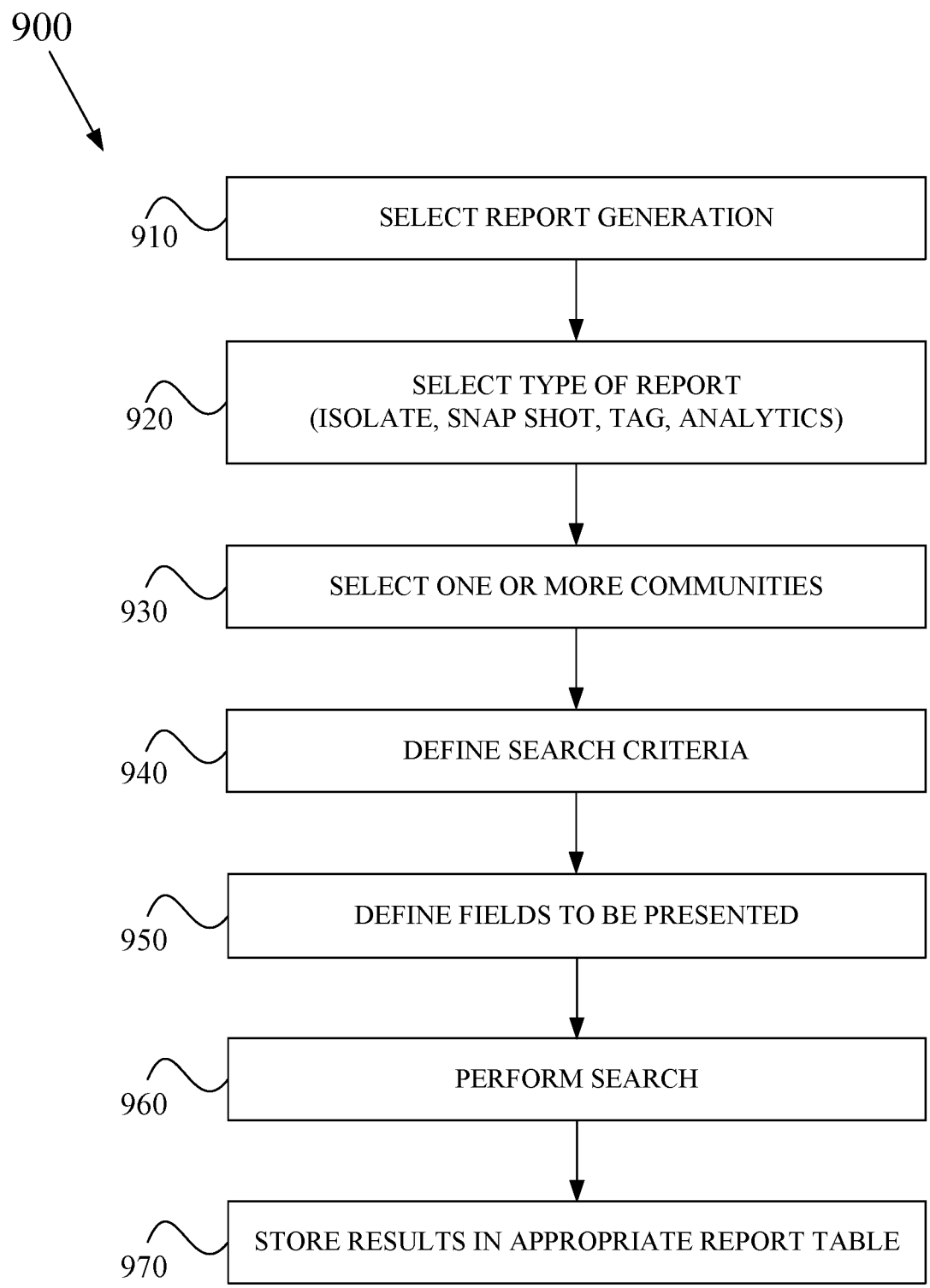
FIG. 9 illustrates an example process flow for preparing various reports, according to one embodiment.

FIG. 9 illustrates an example process flow for preparing various reports 900. An administrator (or authorized user) selects reports on the user interface 910 and then selects the type of report that the that they want prepared 920. The type of reports available may include, for example, isolates, snap-shots, tags and analytics. An isolate is a report that provides results that are updated in real time (e.g., as data changes the isolate also changes). A snap-shot is a report that provides results for the specific time frame in which the report is generated. The snap-shot may be timestamped so that a comparison of reports from different times may be compared. A tag is a report that captures non-linear or random data. An analytics report looks for trends or the like in the captured data.

The one or more communities that are to be included in the reports are then selected 930. The communities selected define the information that is available (e.g., data, users), who can access the information, and various other parameters associated therewith. The search criteria are then defined 940. The search criteria may be linear for isolates and snap shots. For example, the linear search criteria may be presence and/or absence of one or more items (e.g., users owing money, users who went to an event, users requiring a security clearance (namecheck), users who registered for class and don't owe a balance). The search criteria for a tag may be the selection of various items that may not necessarily be related (e.g., selection of users that may not have presence and/or absence of the same items). The search criteria for analytics may be defining specific trends that are being looked for (e.g., users with decreasing balances, users with increasing attendance).

The fields that are to be presented and the order they are to be presented for each report are then identified 950. The search is then performed 960. The search may search any table in the tenant database for information associated with the one or more communities selected. The results may be stored in an appropriate report table in the tenant database 970. For example, isolates may be stored in an isolates table, snap-shots may be stored in a snap-shots table, tags may be stored in a tags table and analytics may be stored in an analytics table. The isolates may simply store the criteria and not the results as these reports are capturing real-time information rather than the information at a specific point in time. It should also be noted that if the information captured in the reports includes fields that are encrypted, the encrypted data will only appear if the encryption key is provided.

As previously noted, some reports (e.g., snap-shots) may be time stamped so that a comparison of different reports can be performed in the future. The comparison may identify the data that has changed between one report and the next (e.g., identify information added, information deleted and information changed).

The process flow 900 is in no way intended to be limited to the illustrated steps. Rather, additional steps can be added, steps can be combined, steps can be deleted, steps can be modified and/or the order of the steps can be modified without departing from the current scope. The process flow 900, or portions thereof, may be performed by a processor executing instructions stored on a computer readable storage medium. The various steps may be performed by individual components (e.g., the application server 130, the proxy server 120, the database server 140) or combinations of components of the system. Some steps may require the use of devices outside of the system, such as a client device to display an applicable user interface.

The user interfaces described in process flow 900 is not limited to any specific embodiment. Rather, any user interface (or combination of user interfaces) that enable the functions to be performed is considered within the scope of the current invention. The application server 130 may provide the information needed to generate the appropriate user interfaces and the information provided within the user interfaces may be based on information stored in various tables in the tenant database on the NAS 150 for the particular tenant and selections made on the user interfaces. The application server may instruct the database server 140 to search the various tables for defined information, may prepare the reports based thereon and may instruct the database server to write the generated reports to the appropriate tables in the tenant database within the NAS 150.

Figure 10:
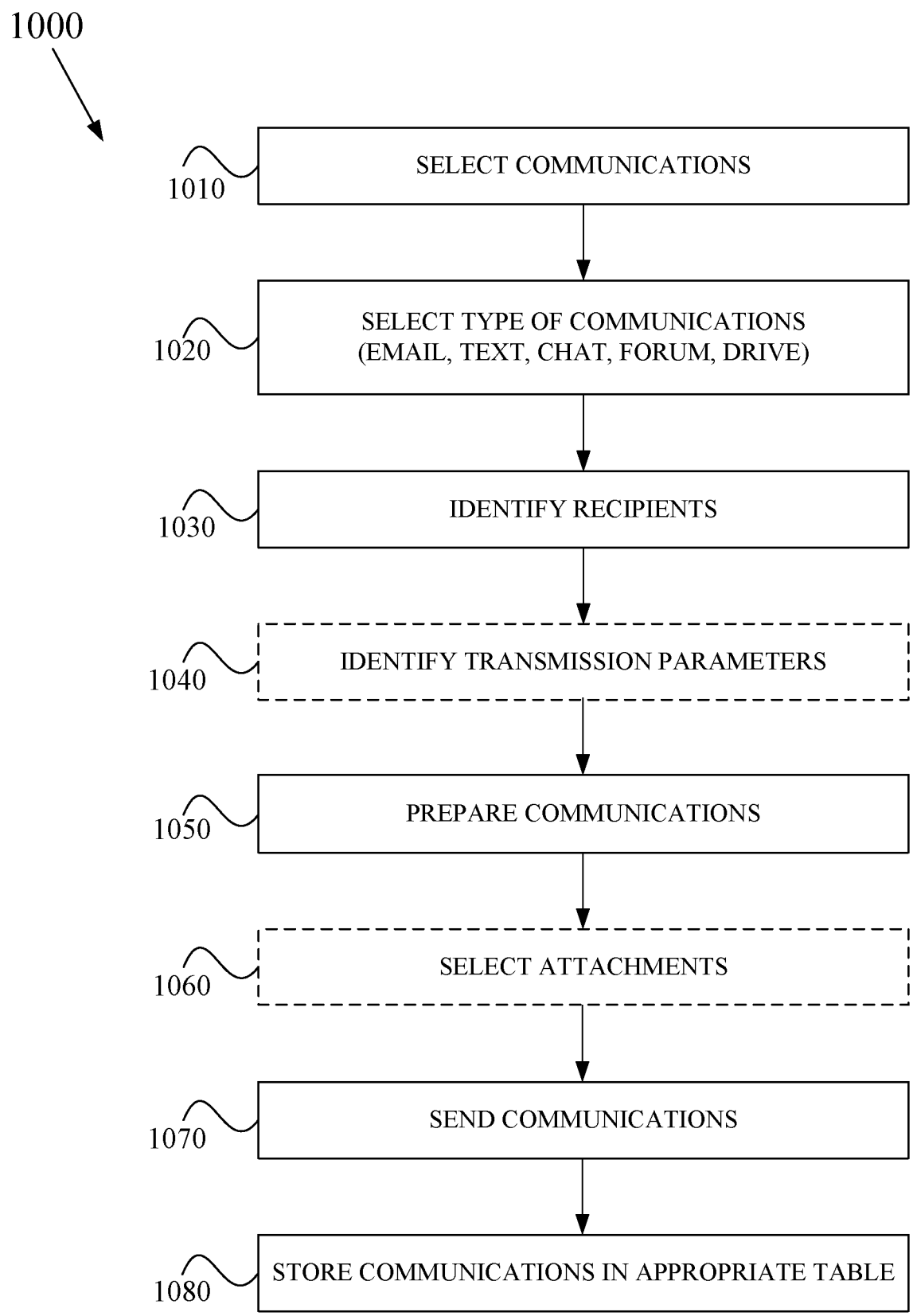
FIG. 10 illustrates an example process flow for the system enabling communications, according to one embodiment.

FIG. 10 illustrates an example process flow for the system enabling communications 1000. An administrator (or authorized user) selects communications on the user interface 1010 and then selects the type of communications they want to initiate 1020. The user interface may enable you to select different manners for communicating including, for example, email, text, chat, forum and drive. The administrator may then identify recipients for the communication 1030. The recipients may be individual users, users that are in your network, users in same community and/or users that are included in reports (isolates, snap-shots, tags and/or analytics). The administrator may define parameters for when the communication is to be sent 1040. The parameters may include defined times (e.g., every morning) or changes in record or event status (e.g., record is added to or removed from a report, event captured in report is changed).

The administrator may prepare the communication that is to be sent (verbiage that recipients are to receive) 1050. If the communication type is sharing information on an external drive, the information to be shared needs to be identified 1060. The information to be shared may be a report (isolate, snap-shot, tag and/or analytic) or a document or image that has been uploaded. The communications is sent to the defined recipients 1070. The communications may be sent based on the defined criteria being met. The communications may be automatically sent by the system when the criteria are met or the system may notify the administrator that the criteria are met and the administrator may then initiate the sending of the communications. Alternatively, the administrator may send the communications when desired. The communications are then stored in an appropriate table in the tenant database (e.g., emails in email table, texts in text table, chats in chat table, forums in forum table and drive in drive table) 1080. For emails and texts, templates of the communication may be stored rather than the actual communication.

It should be noted that steps 1040, 1060 are illustrated with dotted lines to indicate these are optional steps as criteria for sending the communications need not be included and not all communications will include attachments. The process flow 1000 is in no way intended to be limited to the illustrated steps. Rather, additional steps can be added, steps can be combined, steps can be deleted, steps can be modified and/or the order of the steps can be modified without departing from the current scope. The process flow 1000, or portions thereof, may be performed by a processor executing instructions stored on a computer readable storage medium. The various steps may be performed by individual components (e.g., the application server 130, the proxy server 120, the database server 140) or combinations of components of the system. Some steps may require the use of devices outside of the system, such as a client device to display an applicable user interface.

The user interfaces described in process flow 1000 is not limited to any specific embodiment. Rather, any user interface (or combination of user interfaces) that enable the functions to be performed is considered within the scope of the current invention. The application server 130 may provide the information needed to generate the appropriate user interfaces and the information provided within the user interfaces may be based on information stored in various tables in the tenant database on the NAS 150 for the particular tenant and selections made on the user interfaces. The application server may instruct the database server 140 to search the various tables for defined information, may initiate the communications and may instruct the database server to write the communications to the appropriate tables in the tenant database within the NAS 150.

Figure 11:
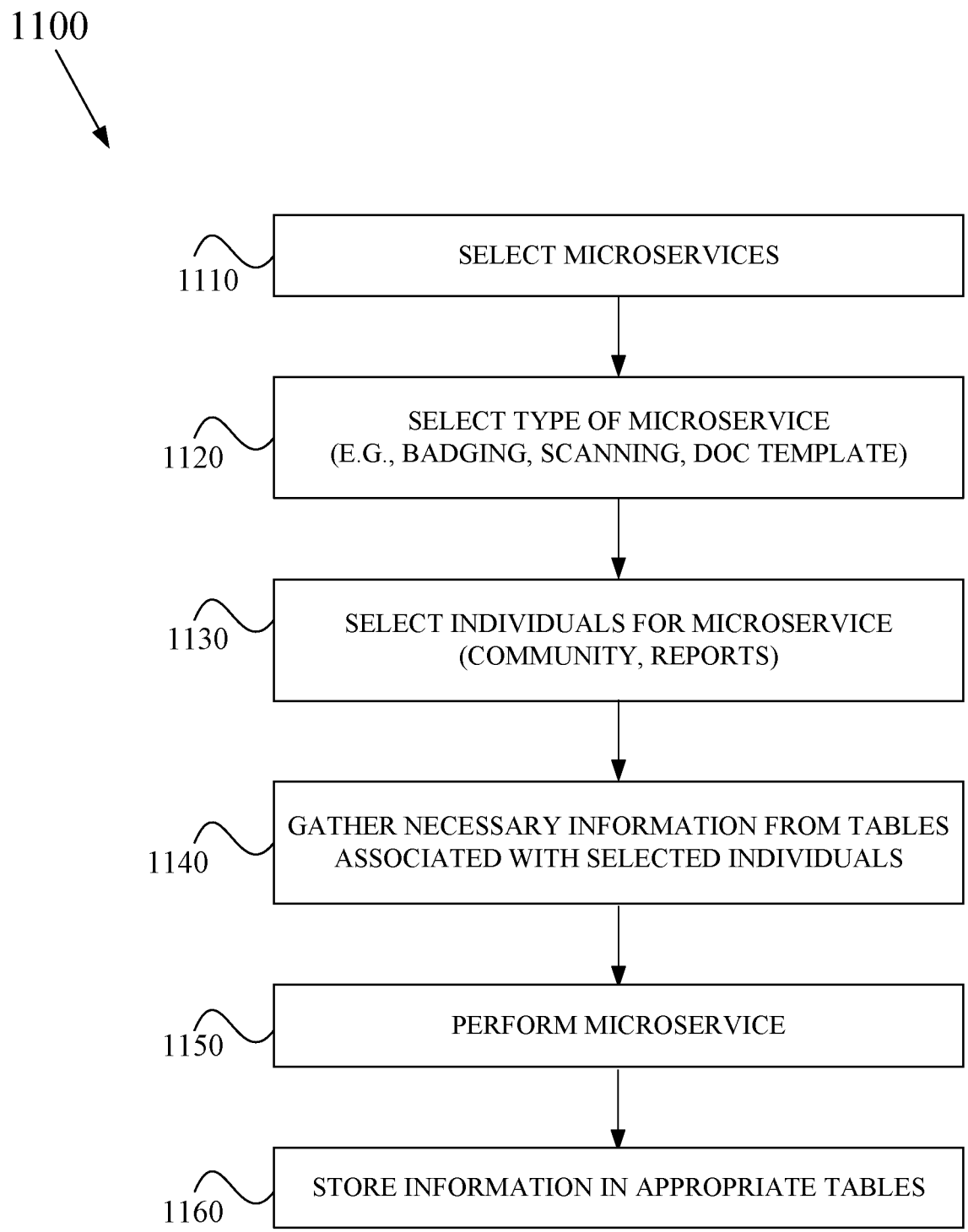
FIG. 11 illustrates various microservices that may be performed based on data captured in the system, according to one embodiment.

FIG. 11 illustrates how microservices may be performed for communities identified in the system. An administrator (or authorized user) selects microservices on the user interface 1110 and then selects the type of microservice they want to initiate 1120. The microservices may include, but are not limited to, badging, scans and biometrics, field operations, document templating, events, scheduling and interfacing with API for mobile applications or external systems. The administrator may select individuals that the microservice should be performed on 1130. The administrator may select one or more communities or may limit to individuals included in a report (e.g., members from community owing money, members from community requiring namecheck). The community selected may define permissions and the like that are associated therewith. The system may retrieve necessary information from one or more tables in the database that are associated with the selected community 1140. The system may perform the selected microservice based on the communities that the individual is associated with and the permissions associated with the community as defined in the communities table 1150. After the microservice is performed, information generated by the microservice may be stored in an appropriate table 1160.

The badging microservice may include, but is not limited to, templating badges, printing badges and rendering electronic badges. Information about the person obtaining a badge may be retrieved from an appropriate table and may be utilized by the badging microservice. The information utilize may simply be the name or may be other details (e.g., employee number, division). Once the badge is created, the badge and/or the fact that the badge was generated may be stored in an appropriate table. The information about the badge being generated may include, for example, the date, time, location, and/or event that it was created for and the type of badge that was created.

The scans and biometrics microservice may include, but is not limited to, reading barcodes, reading RFID, facial scanning and fingerprinting for users. The information gathered may be added to an appropriate table for the users. The information gathered may also be compared to previous information gathered for the user to confirm it is them and to check their status and privileges. The comparisons may be stored in an appropriate table for the users.

The field operations microservice may include, but is not limited to, printing, quick viewing and check-in and may be used to check a user's status and privileges. Any instances are captured and stored in an appropriate table.

The document templating microservice may create a selected form for an individual and utilize information about the user stored in an appropriate table in the database to at least populate a portion of the form. Once the form is complete and rendered the document may be uploaded into the system for the individual and stored in an appropriate table.

The events microservice may be used to create events for a community based on the permissions and parameters associated therewith and may store the events in an appropriate table. The details associated with the event (schedules, location, date, time, criteria) may be available for the members of the associated community and may be used in various features of the system.

The scheduling microservice may be used define schedules for a community based on the permissions and parameters associated therewith and may store the schedule in an appropriate table. The details associated with the schedules (tasks, work schedule, date, time, criteria) may be available for the members of the associated community and may be used in various features of the system.

The API microservice may enable the system to communicate with an API for an a mobile application or external system. The API microservice may be able to supply information to the API from associated tables for processing by the mobile app and/or external system. The communication with the API may be recorded in an appropriate table. The results of processing by the API or information generated by the API may be captured in an appropriate table.

The process flow 1100 is in no way intended to be limited to the illustrated steps. Rather, additional steps can be added, steps can be combined, steps can be deleted, steps can be modified and/or the order of the steps can be modified without departing from the current scope. The process flow 1100, or portions thereof, may be performed by a processor executing instructions stored on a computer readable storage medium. The various steps may be performed by individual components (e.g., the application server 130, the proxy server 120, the database server 140) or combinations of components of the system. Some steps may require the use of devices outside of the system, such as a client device to display an applicable user interface or equipment associated with the selected microservice (e.g., scanner, RFID reader, printer). The user interfaces described in process flow 1100 is not limited to any specific embodiment. Rather, any user interface (or combination of user interfaces) that enable the functions to be performed is considered within the scope of the current invention.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A multi-tenancy system to perform tactical and permanent database and communication operations, the system comprising:
   a firewall to monitor incoming and outgoing traffic;
   an application server unit including memory for storing instructions that when executed cause the application server unit to control operations of the system, wherein the operation of the system for a tenant is controlled by community structures defined for the tenant, wherein the community structures define compartmentalized permissions;
   a database server unit to store information for the tenant in various tables, wherein the database server unit is a low code/no code database platform that utilizes graphical interfaces to build data structures, wherein data located within the firewall, the application server unit and the database server unit is encrypted, and wherein data is encrypted as it is being transmitted between the firewall, the application server unit and the database server unit; and
   a form builder that enables forms to be prepared based on the community structures, wherein the system is configured to enable microservices to be performed on information captured therein based on the community structures.

2. The system of claim 1, wherein personally identifiable information (PII) stored in the system is further encrypted and is only viewable with appropriate decryption key.

3. The system of claim 1, wherein the community structures replicate an organizational structure.

4. The system of claim 1, wherein the community structures provide a database structure for managing people as a nested or linear grouping.

5. The system of claim 1, wherein the community structure automatically compartmentalizes records in groups.

6. The system of claim 1, wherein the community structure establishes default collaborative user interactions.

7. The system of claim 1, wherein a data hash is created for dynamic fields that are included in a form and the data hash is added as a column in a form table so that a restart is not required.

8. The system of claim 1, wherein reports are generated based on community structures.

9. The system of claim 8, wherein the reports include isolates that are updated in real time.

10. The system of claim 8, wherein the reports include snap shots that capture information at time report is generated, wherein a comparison of different snap shots can be generated.

11. The system of claim 1, wherein communications between users is enabled.

12. The system of claim 11, wherein the communications is associated with the community structure.

13. The system of claim 11, wherein the communications include at least some subset of email, text, chat, and drive.

14. The system of claim 1, wherein the microservices utilize information previously captured for the community structure to perform the microservice.

15. The system of claim 1, wherein the microservices provide information for the community structure based on performance of the microservice.

16. The system of claim 1, wherein the microservices include at least some subset of badging, scanning, biometrics, field operations, and document templating.

17. The system of claim 1, wherein the microservices are performed external to the system and the system communicates with an application program interface.

* * * * *